(12) United States Patent
Kunii et al.

(10) Patent No.: US 10,823,361 B2
(45) Date of Patent: Nov. 3, 2020

(54) HEADLIGHT APPARATUS

(71) Applicant: MAXELL, LTD., Kyoto (JP)

(72) Inventors: Yasuhiko Kunii, Kyoto (JP); Toshinori Sugiyama, Kyoto (JP); Koji Hirata, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/480,901

(22) PCT Filed: Jan. 18, 2018

(86) PCT No.: PCT/JP2018/001319
§ 371 (c)(1),
(2) Date: Jul. 25, 2019

(87) PCT Pub. No.: WO2018/139325
PCT Pub. Date: Aug. 2, 2018

(65) Prior Publication Data
US 2020/0011501 A1    Jan. 9, 2020

(30) Foreign Application Priority Data

Jan. 25, 2017   (JP) ................................ 2017-011047

(51) Int. Cl.
*F21S 41/64*    (2018.01)
*F21S 41/25*    (2018.01)
(Continued)

(52) U.S. Cl.
CPC .......... *F21S 41/645* (2018.01); *F21S 41/135* (2018.01); *F21S 41/143* (2018.01); *F21S 41/153* (2018.01);
(Continued)

(58) Field of Classification Search
CPC ...... F21S 41/135; F21S 41/143; F21S 41/153; F21S 41/25; F21S 41/645; F21S 43/00;
(Continued)

(56) References Cited

U.S. PATENT DOCUMENTS 7,654,712 B2 *  2/2010  Takeda .................. F21V 17/164
                                                      362/459
2003/0189839 A1  10/2003  Shikano
(Continued)

FOREIGN PATENT DOCUMENTS

JP    2000-295413 A    10/2000
JP    2003-297116 A    10/2003
(Continued)

OTHER PUBLICATIONS

Translation of JP 2016186850 provided by Espacenet (Year: 2016).*
(Continued)

*Primary Examiner* — Zheng Song
(74) *Attorney, Agent, or Firm* — Volpe Koenig

(57) ABSTRACT

A vehicle headlight apparatus, on a vehicle applies illumination light to a road surface, comprises: a light source device to generate the illumination light; and a lens on a light axis of the light source device and projects the illumination light from the light source device to form a desired light distribution, wherein the light source device includes: one or more semiconductor light source elements to emit light; a collimator unit having one or more collimators disposed on a light emission axis of each of the semiconductor light source elements and converts light emitted from a solid light source into substantially parallel light; and a polarization conversion element provided on an emission surface side of the collimator unit and converts incident light into predetermined polarized light, and the illumination light emitted from the polarization conversion element of the light source (Continued)

device is applied in a predetermined direction through the lens.

10 Claims, 13 Drawing Sheets

(51) Int. Cl.
| | | |
|---|---|---|
| *F21S 41/135* | (2018.01) | |
| *F21S 41/143* | (2018.01) | |
| *F21S 41/153* | (2018.01) | |
| *F21S 41/20* | (2018.01) | |
| F21Y 105/16 | (2016.01) | |
| F21Y 113/13 | (2016.01) | |
| F21Y 103/10 | (2016.01) | |
| F21Y 115/10 | (2016.01) | |
| F21W 102/135 | (2018.01) | |
| F21S 45/47 | (2018.01) | |

(52) U.S. Cl.
CPC .............. *F21S 41/25* (2018.01); *F21S 41/285* (2018.01); *F21S 45/47* (2018.01); *F21W 2102/135* (2018.01); *F21Y 2103/10* (2016.08); *F21Y 2105/16* (2016.08); *F21Y 2113/13* (2016.08); *F21Y 2115/10* (2016.08)

(58) Field of Classification Search
CPC .. F21S 45/00; F21S 45/47; F21V 5/04; F21V 7/00; F21V 7/22; F21V 9/14; F21V 9/40; F21W 2102/135
See application file for complete search history.

(56) References Cited

U.S. PATENT DOCUMENTS

| | | | |
|---|---|---|---|
| 2004/0174594 A1 | | 9/2004 | Shikano |
| 2008/0029701 A1 | | 2/2008 | Onozawa et al. |
| 2008/0043466 A1 | | 2/2008 | Chakmakjian et al. |
| 2008/0198372 A1* | | 8/2008 | Pan ........................ B60Q 1/38 356/121 |
| 2009/0034278 A1 | | 2/2009 | Tessnow et al. |
| 2011/0163671 A1* | | 7/2011 | Chen .................... F21S 41/645 315/82 |
| 2011/0280032 A1* | | 11/2011 | Kishimoto ............. B82Y 20/00 362/538 |
| 2012/0250330 A1* | | 10/2012 | Kelly ............... B29D 11/00596 362/308 |
| 2014/0362600 A1* | | 12/2014 | Suckling ................ F21S 41/143 362/583 |
| 2016/0377251 A1* | | 12/2016 | Kim ................... G06K 9/00791 362/466 |
| 2018/0017224 A1* | | 1/2018 | Sirowatka ............. F21S 41/148 |
| 2019/0011100 A1* | | 1/2019 | Son .......................... F21K 9/68 |

FOREIGN PATENT DOCUMENTS

| | | |
|---|---|---|
| JP | 2004-235127 A | 8/2004 |
| JP | 2005-071731 A | 3/2005 |
| JP | 2008-532250 A | 8/2008 |
| JP | 2008-252357 A | 10/2008 |
| JP | 2010-500735 A | 1/2010 |
| JP | 2014-222567 A | 11/2014 |
| JP | 2015-133170 A | 7/2015 |
| JP | 2015-174551 A | 10/2015 |
| JP | 2016-186850 A | 10/2016 |
| WO | 2013/161353 A1 | 10/2013 |

OTHER PUBLICATIONS

Translation of JP 2008252357 provided by Espacenet (Year: 2008).*
Translation of JP 2005071731 provided by Espacenet (Year: 2005).*
Translation of JP 2003/297116 provided by Espacenet (Year: 2003).*
International Search Report for PCT/JP2018/001319, dated Mar. 27, 2018.

* cited by examiner

FIG. 1
(a)
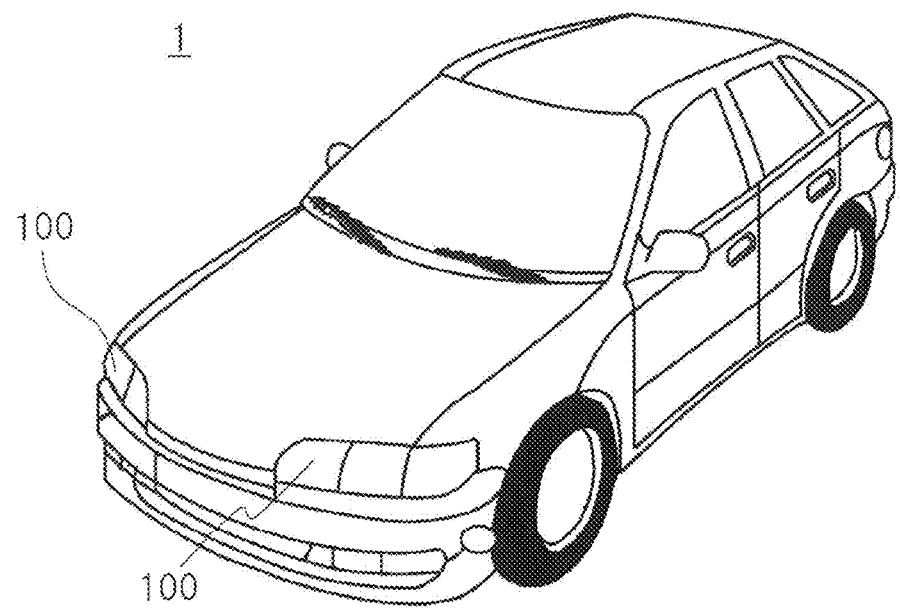
(b)
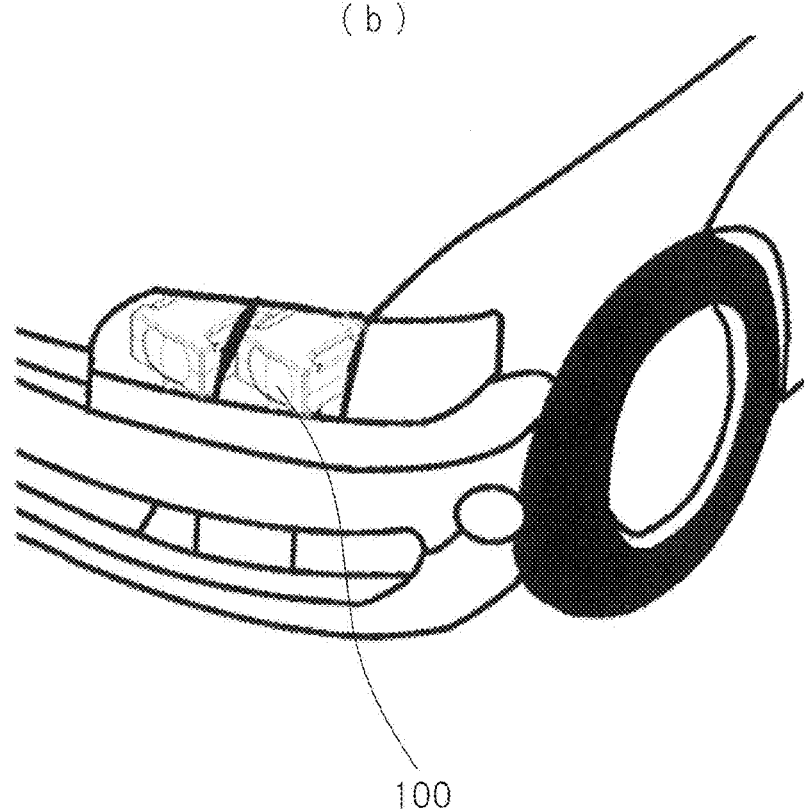

FIG. 2
(a)
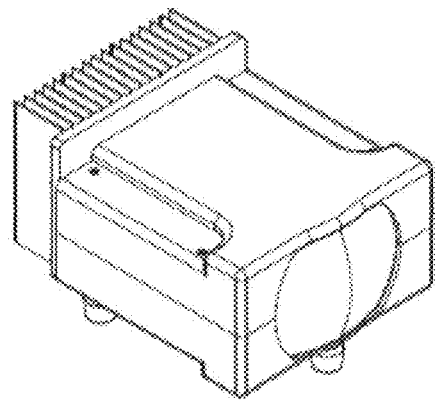
(b)
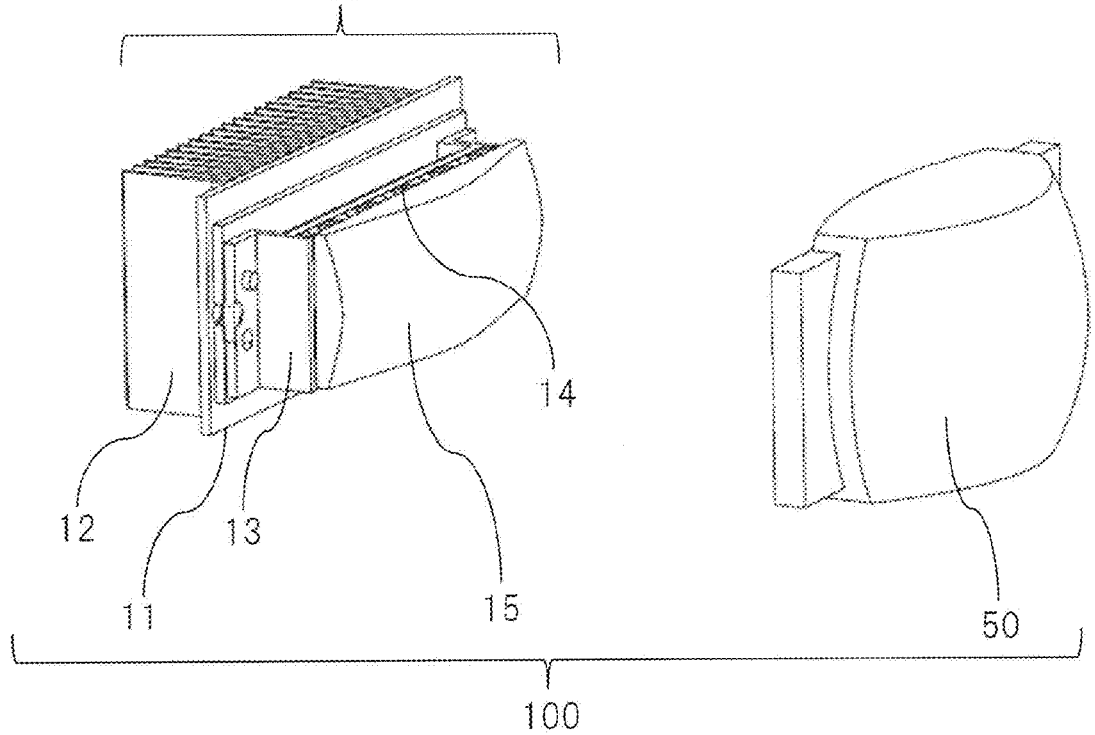

FIG. 9
(a)
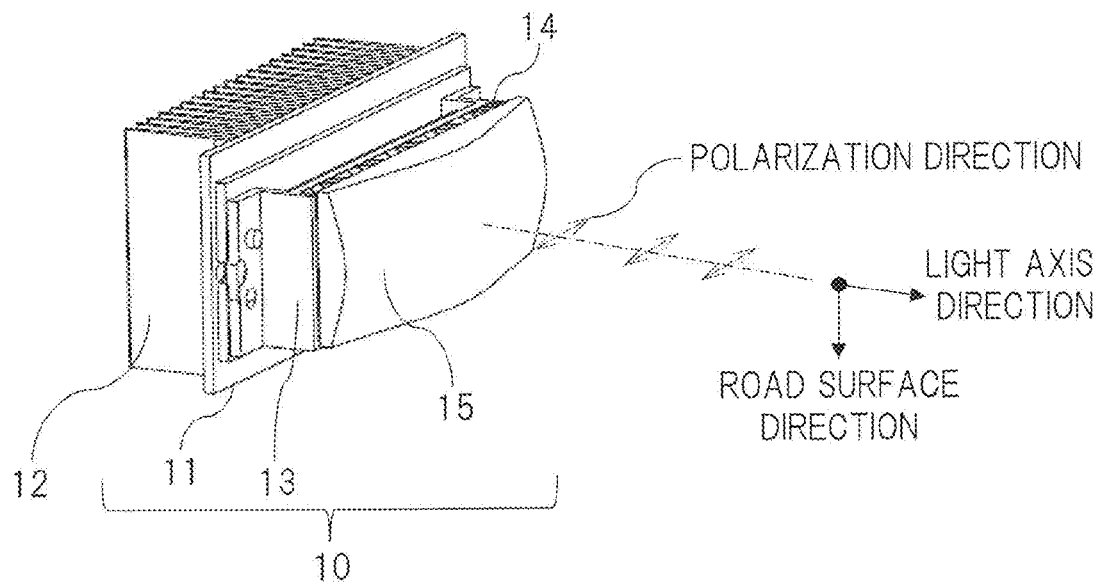
(b)
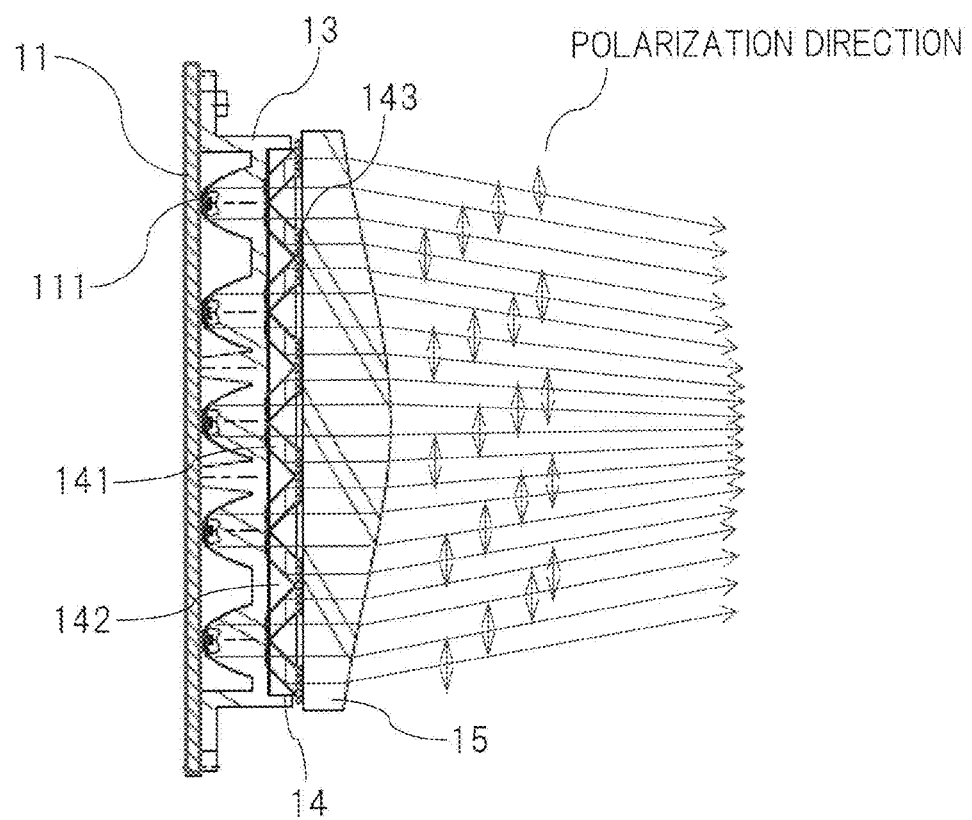

FIG. 12
(a)
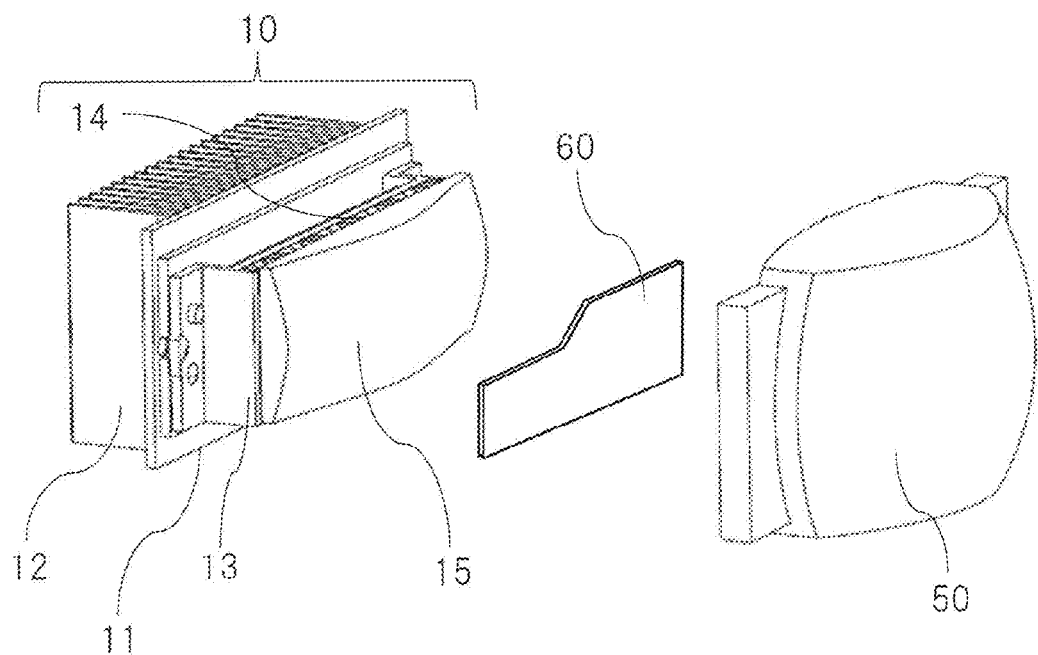
(b)
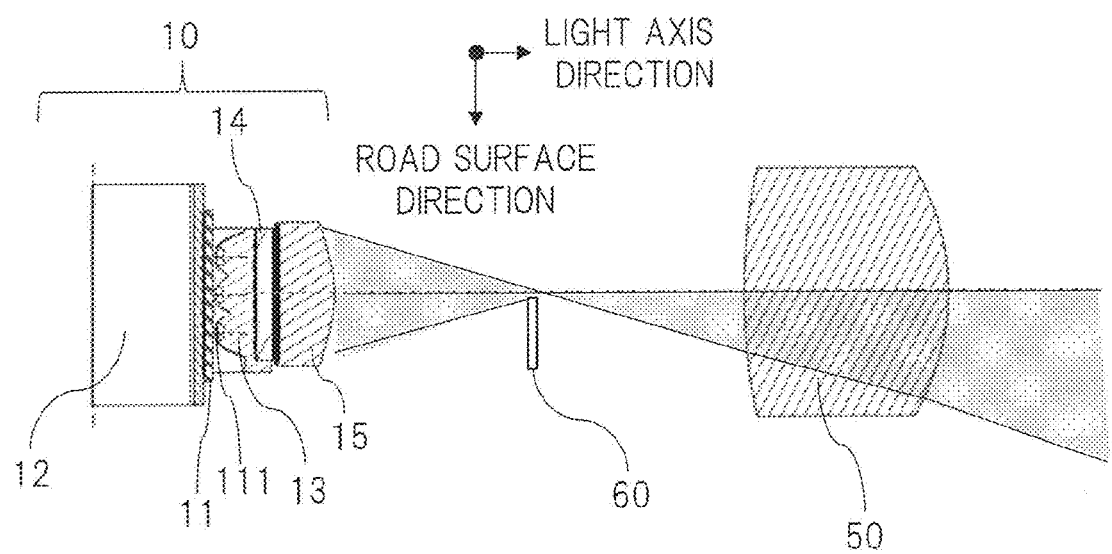

HEADLIGHT APPARATUS

TECHNICAL FIELD

The present invention relates to a vehicle headlight apparatus using a solid light emitting element.

BACKGROUND ART

With the remarkable development of a solid light emitting element such as LED in recent years, a lighting apparatus using the solid light emitting element as a light source has been widely used in various types of lighting equipment as a small-sized, light-weight, low-power consumption and long-life light source excellent for environmental protection, and such a lighting apparatus has been used also as a vehicle headlight apparatus in which various types of control are possible as an on-vehicle electronic device.

For example, as a conventional vehicle headlight apparatus, a vehicle headlamp comprising: a low-beam LED light source array; a high-beam LED light source array; a first optical light guide configured to receive low-beam light and high-beam light from these LED light sources to collimate them; and a second optical light guide configured to diffuse the collimated low-beam light and high-beam light as a combination of diffusion patterns, wherein these arrays and light guides are mechanically supported in a casing has already been known by the following Patent Document 1.

Also, according to the Patent Document 2, a vehicle headlight which relates to a light distribution control headlight using the so-called MEMS (Micro Electro Mechanical Systems) and is configured to use infrared light which is invisible light is disclosed. Here, the angle of the mirror is controlled so that the infrared light is applied to the region where the visible light is turned off so as not to give glare. Furthermore, according to the Patent Document 3, a vehicle headlight configured to reduce the adverse effect of sunlight on a light emitting diode is proposed.

In addition, according to the following Patent Document 4, though it relates to a conventional lamp rather than a LED light source, a headlight that emits p-polarized light subjected to polarization conversion is disclosed. Furthermore, according to the Patent Document 5, a technology in which s-polarized light reflected by a reflective polarizer is made to be elliptically polarized light by a phase plate, and then is used as a p-polarized component is described.

RELATED ART DOCUMENTS

Patent Documents

Patent Document 1: Japanese Patent Application Laid-open Publication No. 2008-532250
Patent Document 2: Japanese Patent Application Laid-open Publication No. 2015-174551
Patent Document 3: Japanese Patent Application Laid-open Publication No. 2015-133170
Patent Document 4: Japanese Patent Application Laid-open Publication No. 2004-235127
Patent Document 5: Japanese Patent Application Laid-open Publication No. 2014-222567

SUMMARY OF THE INVENTION

Problems to be Solved by the Invention

With the improvement in light emission efficiency, the LED which is a solid light source has been effectively used as a light emission source in a vehicle headlamp apparatus. However, in the prior-art technologies, the Patent Document 1 and the Patent Document 2 mentioned above, the light use efficiency characteristics and uniform lighting characteristics are still insufficient and there are various kinds of rooms for improvement.

Also, in the Patent Document 3, by forming a photochromic layer on a lens surface, the transmittance is reduced in the daytime and the transmittance is recovered in the night-time according to the UV component contained in the sunlight. However, the photochromic layer is a technology used for the dye of DVD and others, and the dye will cease to change when the photochromic layer is left in the sunlight environment. Therefore, it is difficult to use the photochromic layer as an exterior part of an automobile that usually exposed to the sunlight. The Patent Document 4 does not describe the application to the LED which is a solid light source, and the Patent Document 5 has a problem of the loss due to multiple reflection.

Thus, an object of the present invention is specifically to provide a vehicle headlight apparatus, which has high use efficiency of light emitted from a LED light source and uniform lighting characteristics, can achieve the size reduction of the apparatus, and can be manufactured at low cost, by using a light source device easily used as a modularized planar illumination light source.

Means for Solving the Problems

As an embodiment for achieving the object described above, the present invention provides a vehicle headlight apparatus attached to a part of a vehicle and applying illumination light to a road surface on which the vehicle runs, the vehicle headlight apparatus comprising: a light source device configured to generate the illumination light; and a lens disposed on a light axis of the light source device and configured to project the illumination light from the light source device so as to form a desired light distribution, wherein the light source device includes: one or a plurality of semiconductor light source elements configured to emit light; a collimator unit having one or a plurality of collimators disposed on a light emission axis of each of the semiconductor light source elements and configured to convert light emitted from a solid light source into substantially parallel light; and a polarization conversion element provided on an emission surface side of the collimator unit and configured to convert incident light into predetermined polarized light, and the illumination light emitted from the polarization conversion element of the light source device is applied in a predetermined direction through the lens.

Effects of the Invention

According to the present invention, it is possible to obtain the remarkable effect of providing a low-power consumption and long-life vehicle headlight apparatus excellent for environmental protection by using a light source device which can be manufactured at low cost, is small-sized and easily modularized, and has high light use efficiency.

BRIEF DESCRIPTIONS OF THE DRAWINGS

FIG. 1(a) is a perspective view showing an overall configuration in which a vehicle headlight apparatus according to a first embodiment of the present invention is applied as a headlamp of an automobile and FIG. 1(b) is a perspective view showing a part of the configuration;

FIG. 2(a) is a perspective view showing an overall configuration of the vehicle headlight apparatus according to the first embodiment of the present invention and FIG. 2(b) is a developed perspective view showing a developed configuration of the headlight apparatus;

FIG. 9(a) is a perspective view showing a visible light lighting unit centered around a collimator unit in the vehicle headlight apparatus according to the second embodiment of the present invention and FIG. 9(b) is a top cross-sectional view showing the visible light lighting unit;

Figure 13:
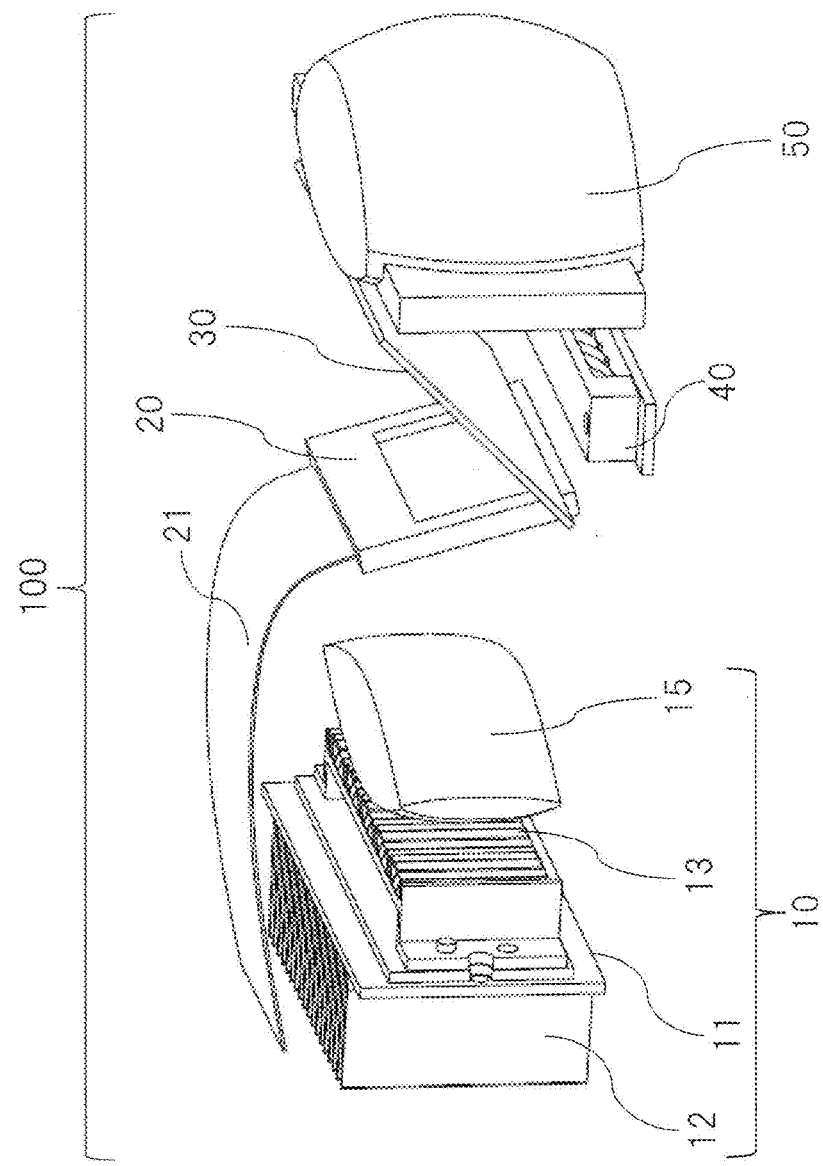

FIG. 12(a) is a perspective view showing an overall configuration of a vehicle headlight apparatus according to a third embodiment of the present invention and FIG. 12(b) is a top cross-sectional view of the headlight apparatus; and FIG. 13 is a developed perspective view showing a configuration example in the case where a visible light lighting unit which is a light source device is small with respect to a LCD panel as a modification example (fourth embodiment) of the configuration of the first embodiment of the present invention.

DETAILED DESCRIPTION OF PREFERRED EMBODIMENTS

Hereinafter, embodiments of the present invention will be described in detail with reference to the attached drawings. Note that the present invention is not limited to the following descriptions and can be changed and modified in various ways by a person having ordinary skill in the art within a range of a technical idea disclosed in this specification. Also, components having the same function are denoted by the same reference characters throughout the drawings for describing the embodiments, and the repetitive description thereof will be omitted in some cases.

First Embodiment

Figure 3:
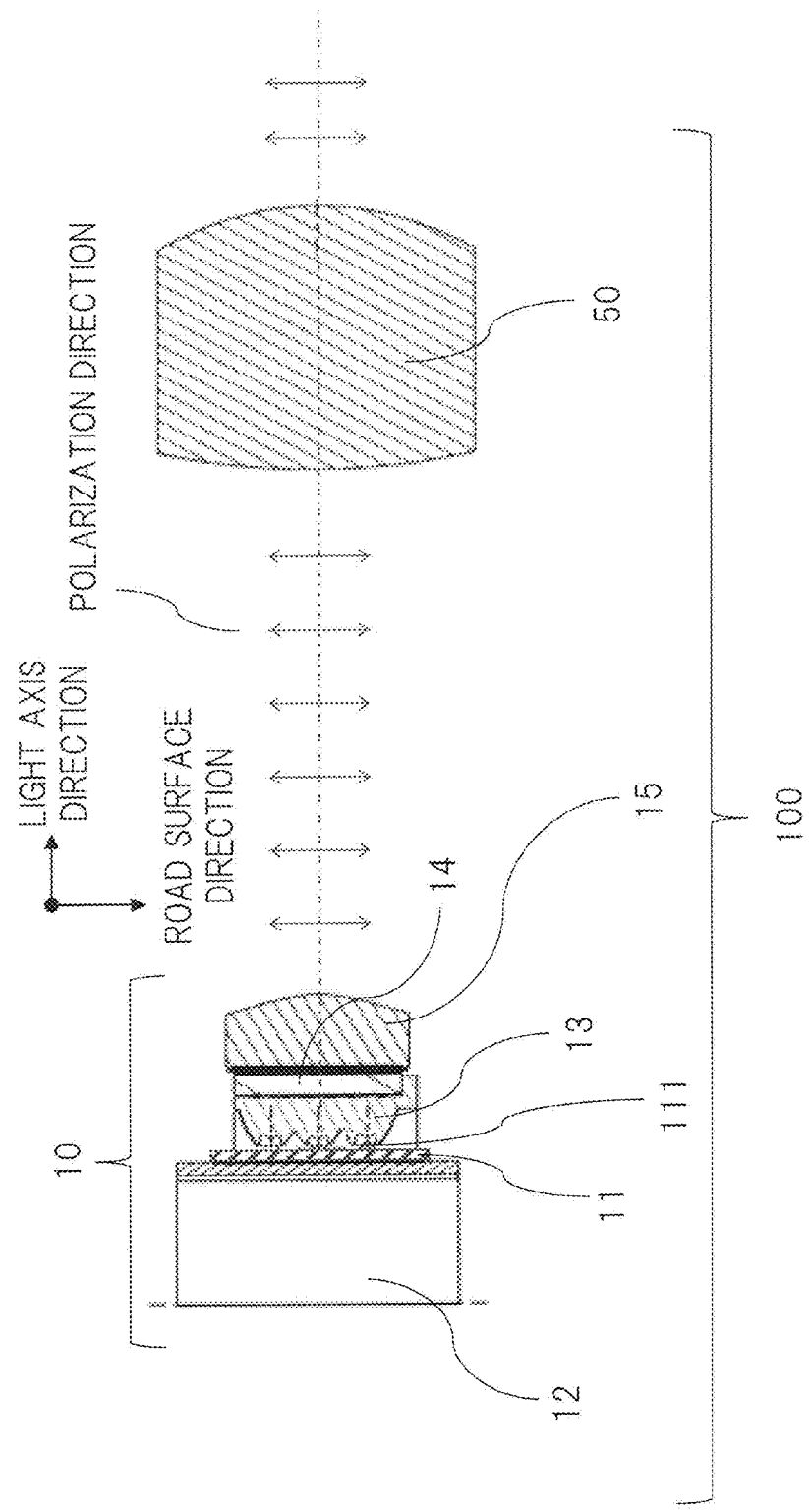
FIG. 3 is a side cross-sectional view showing the overall configuration of the vehicle headlight apparatus according to the first embodiment of the present invention.

First, in FIGS. 1 to 3, a vehicle headlight apparatus using a light source device according to a first embodiment of the present invention is shown in perspective views and a cross-sectional view. FIG. 1(a) shows an overall configuration of a vehicle 1 in which a vehicle headlight apparatus 100 according to the present invention is mounted and FIG. 1(b) shows an enlarged view of a part of the vehicle headlight apparatus. FIG. 2(a) is an overall perspective view of the headlight apparatus 100 and FIG. 2(b) shows an internal configuration thereof in a developed manner. Also, FIG. 3 shows a side cross section of the headlight apparatus 100. As can be seen from these figures, the headlight apparatus 100 is basically configured of a visible light lighting unit 10 which is the light source device of the present invention and a so-called projection lens 50 which is an optical system for applying the illumination light emitted from the lighting unit to a front space of the vehicle 1 and a road surface on which the vehicle 1 runs.

The visible light lighting unit 10 which is the light source device of the present invention includes a LED board 11 in which one or a plurality of semiconductor light source element LEDs (Light Emitting Diodes) which are solid light sources to be described later, a control circuit thereof and others are mounted on a front surface, and a heat sink 12 for dissipating heat from the LED to ambient air is attached to a rear surface of the board. Note that, in this embodiment, a total of 15 LEDs are arranged in a grid of 5 (horizontal)×3 (longitudinal) on the LED board 11. Further, a collimator unit 13 to be described later is attached on a light emission surface side of the LED board 11.

Figure 4:
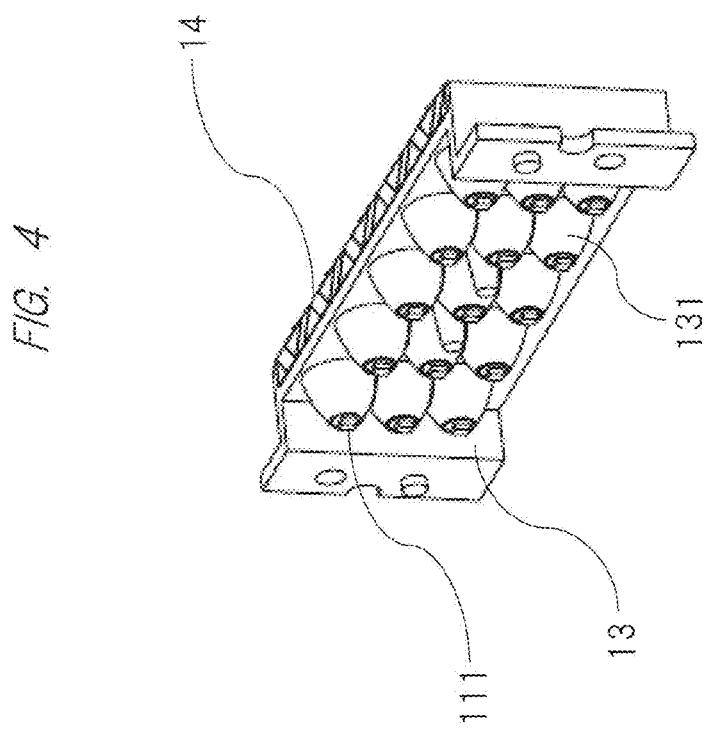
FIG. 4 is a perspective view showing a configuration of a visible light lighting unit centered around a collimator unit in the vehicle headlight apparatus according to the first embodiment of the present invention.

As also shown in FIG. 4, this collimator unit 13 is configured by arranging collimators 131 (in this embodiment, 5 (horizontal)×3 (longitudinal)=15 collimators), which are provided so as to correspond to each of the one or plurality of LEDs 111 mounted on the LED board 11, on a surface inside a plate-like frame body.

Figure 5:
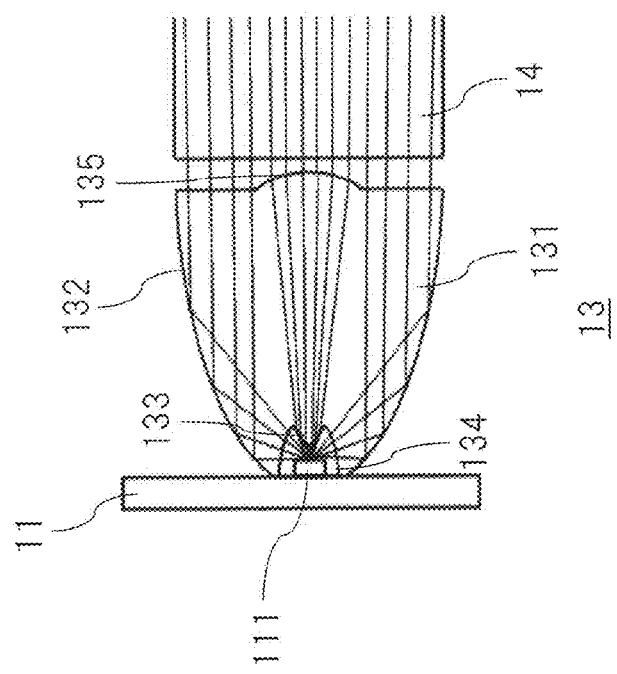
FIG. 5 is a partially enlarged cross-sectional view showing a structure of a collimator in the collimator unit and an operation thereof in the vehicle headlight apparatus according to the first embodiment of the present invention.

Note that each of the collimators 131 is formed of, for example, resin having both the translucency and the heat resistance such as polycarbonate or silicone. Further, as also shown in FIG. 5, each collimator 131 has a conical convex outer peripheral surface 132 obtained by rotating a substantially parabolic cross section, and a concave portion 134 having a convex portion (that is, convex lens surface) 133 at its central portion is formed at the top of the collimator 131. In addition, a convex lens surface projecting to outside (or a concave lens surface recessed to inside) 135 is formed at a central portion of a flat portion of the collimator 131. Note that the parabolic surface (outer peripheral surface) 132 forming the conical outer peripheral surface of the collimator 131 is set within an angle range capable of totally reflecting the light emitted in the peripheral direction from the LED 111 therein or a reflection surface is formed on the surface. The collimator described above can be easily manufactured at low cost by the general forming process.

On the other hand, the LED 111 is attached at a predetermined position on the front surface of the LED board 11 which is a circuit board to mount it, and as can be seen from FIG. 5, the LED board 11 is disposed and fixed so that each LED 111 is located at the position of the central portion of the concave portion 134 of the corresponding collimator 131.

With the above-described configuration of the collimator 131 shown in FIG. 5, the light emitted from the central portion of the LED 111 in an upward direction (to the right in FIG. 5) is collected to be parallel light by the two convex lens surfaces 133 and 135 formed on the surface of the collimator 131 to which the LED light is incident and the surface thereof from which the LED light is emitted. Also, the light emitted from the other part in the peripheral direction is reflected by the parabolic surface (outer peripheral surface) 132 forming the conical outer peripheral surface of the collimator 131 and is then similarly collected to be parallel light. In other words, with the collimator 131 in which the convex lens is formed at the central portion thereof and the parabolic surface (outer peripheral surface) 132 is formed in the peripheral portion thereof, almost all of the light generated from the LED 111 can be taken as the parallel light. Consequently, the use efficiency of the generated light can be sufficiently improved.

Figure 6:
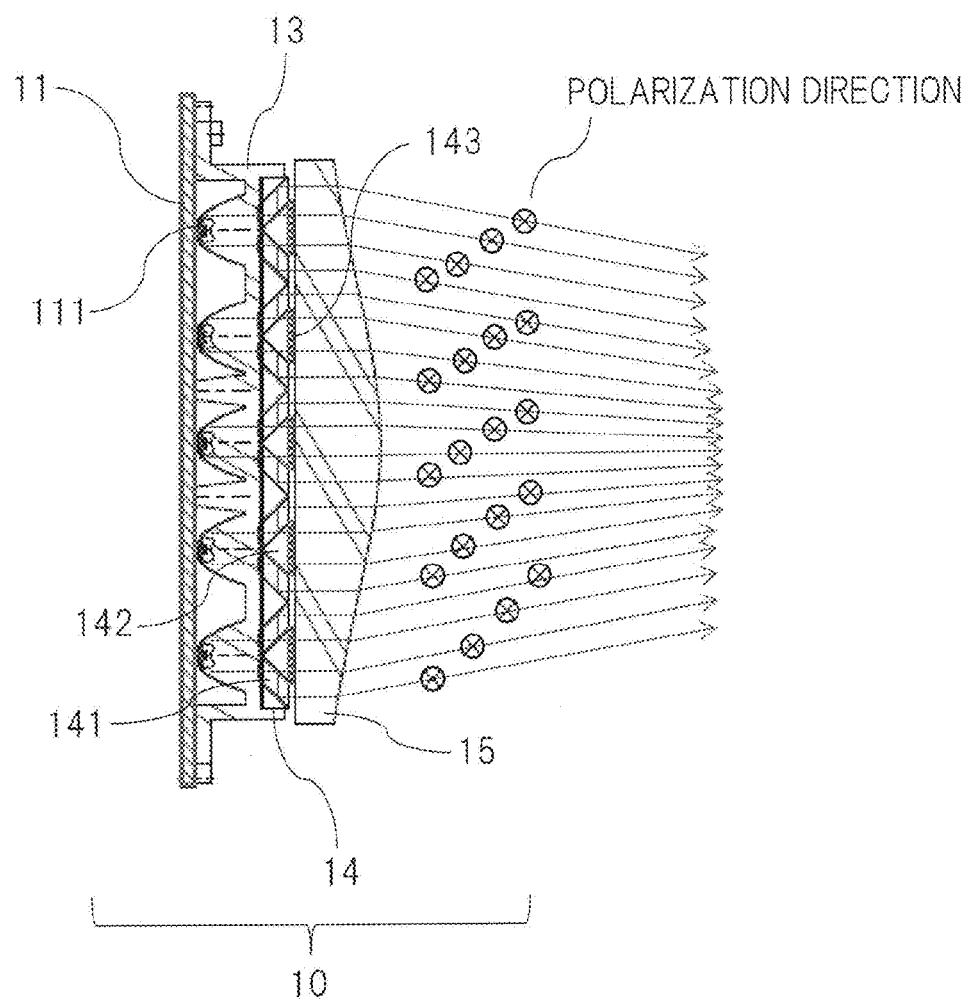
FIG. 6 is a top cross-sectional view showing an operation of the visible light lighting unit centered around the collimator unit in the vehicle headlight apparatus according to the first embodiment of the present invention.

As shown in FIG. 6, in the visible light lighting unit 10, a polarization conversion element 14 is attached to the front surface side of the collimator unit 13, and a free-form surface lens 15 is further attached to the polarization conversion element 14. In this embodiment, the polarization conversion element 14 is configured to convert the light into p-polarized light which is linearly polarized light oscillating in a plane perpendicular to the road surface for the purpose of suppressing the reflection of the illumination light from the light source device on the road surface and the reflection by raindrops/fogs in the case of bad weather or the like.

As can be seen from FIG. 6, the polarization conversion element 14 is configured by combining a plurality of translucent members 141 having a columnar shape whose cross section is parallelogramic (hereinafter, parallelogram column) and a plurality of translucent members 142 having a columnar shape whose cross section is triangular (hereinafter, triangular column) so as to be arranged in an array in parallel to the plane perpendicular to the light axis of the parallel light from the collimator unit 13. Further, at the interfaces between the adjacent translucent members arranged in an array, a polarizing beam splitter (hereinafter, abbreviated as "PBS") film and a reflection film are alternately provided, and a half wave plate 143 is provided on an emission surface from which the light which has been incident on the polarization conversion element 14 and has passed through the PBS film is emitted.

The free-form surface lens 15 described above is disposed on the emission surface side of the polarization conversion element 14. In this free-form surface lens 15, the emission surface or the incident surface or both the emission surface and the incident surface are configured of the free-form surfaces. With this free-form surface lens 15, the illumination light having desired light intensity distribution can be obtained by controlling the emission direction of the light beam by the surface shape of the lens, for example, by intensifying the light distribution at the central portion so as to achieve the distant lighting as indicated by arrows in FIG. 6.

With the headlight apparatus 100 having the configuration described above in detail, the light emitted from the LED 111 is converted into substantially parallel light by the function of the collimator unit 13, and is then converted into linearly polarized light (p-polarized light: polarized light perpendicular to the page) by the polarization conversion element 14. Further, after the light is formed to have the desired light intensity distribution by the free-form surface lens 15, it is enlarged and projected by the projection lens 50 and is applied to the space and the road surface in front of the vehicle. Namely, with the vehicle headlight apparatus according to the first embodiment described above, a low-power consumption and long-life vehicle headlight apparatus excellent for environmental protection, which can be manufactured at low cost, is small-sized and easily modularized, and has high light use efficiency, can be provided by adopting the LED.

In the foregoing, an example of the headlight apparatus according to the present invention and the light source device used for it has been described in detail. Next, other embodiments including a modification example thereof will be described below in detail.

Second Embodiment

First, by providing a liquid crystal panel (LCD panel) 20 which is an image display element in the vehicle headlight apparatus 100 having the basic configuration described above and finely controlling the light distribution by controlling the on/off of the LCD panel (liquid crystal display) 20 constituting the panel, the lighting with secured visibility of the distant place is possible while suppressing the glare to a vehicle traveling in the opposite lane or a vehicle traveling in the same lane. Furthermore, it is also possible to display information indicating the driving state including a travelling speed and a direction of its own vehicle and various types of information relating to the driving of other vehicles on the road surface by using the illumination light.

Figure 7:
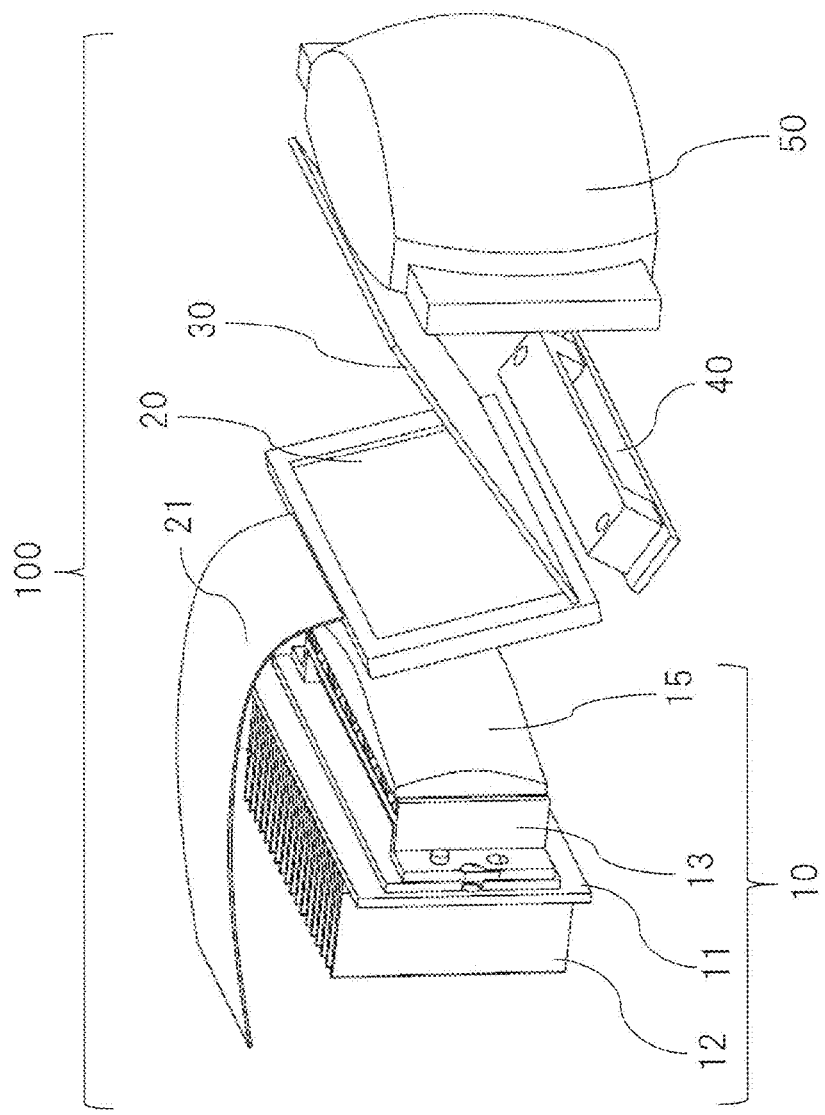
FIG. 7 is a developed perspective view showing an overall configuration of a vehicle headlight apparatus according to a second embodiment of the present invention.
Figure 8:
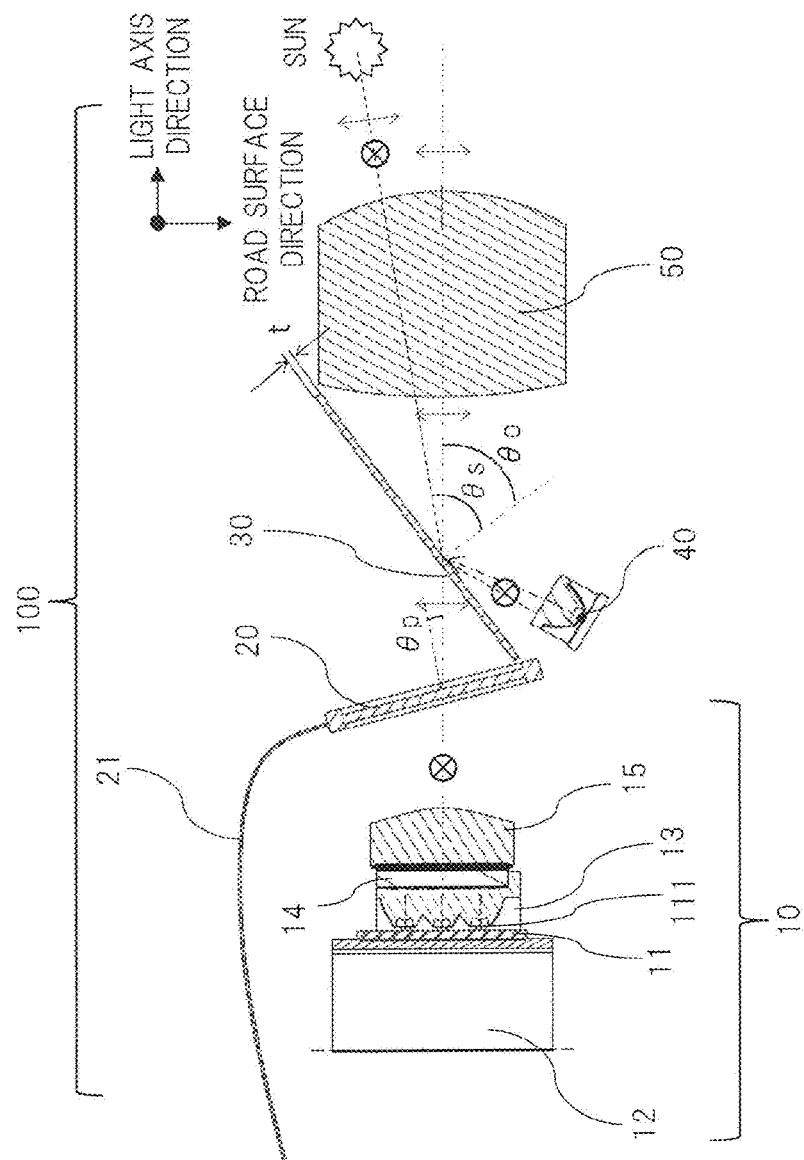
FIG. 8 is a side cross-sectional view showing the overall configuration of the vehicle headlight apparatus according to the second embodiment of the present invention.

FIG. 7 and FIG. 8 show the configuration in which the LCD panel 20 is disposed on a light path of the illumination light from the visible light lighting unit 10 serving as the light source device, more specifically, between the free-form surface lens 15 of the visible light lighting unit 10 and the projection lens 50. Also, a reference character 21 in the drawing denotes a FPC (Flexible Printed Circuits) electrically connected to the LCD panel 20, and the LCD panel 20 is controlled by control signals input from a control circuit (not shown) through the FPC 21.

Note that, when the LCD panel 20 is provided, the burning due to irradiation of sunlight incident from the outside, the deterioration of the characteristics thereof and others are conceivable. Therefore, as a preventive measure, a polarization mirror 30 is further disposed between the LCD panel 20 and the projection lens 50 in this embodiment.

Note that, when information is projected on the road surface, the distance of an image projected on the road surface through the projection lens 50 differs for each of the pixels of the LCD panel 20, and thus, the degradation in the focus performance is caused. Therefore, in order to reduce the defocus amount caused in the image projected on the road surface, the LCD panel is preferably disposed so as to be inclined with respect to the light axis. Accordingly, in this embodiment, as shown also in FIG. 8, the LCD panel 20 is disposed so that the emission surface thereof is inclined upward by an angle of θp (for example, 10 to 15 degrees) with respect to the light axis. Further, although the LCD panel 20 shown in FIG. 7 and FIG. 8 is inclined with respect to the light axis, the LCD panel is not necessarily inclined with respect to the light axis when the headlight apparatus is used as a normal headlamp without displaying the information on the road surface.

Further, at this time, the polarization direction of the light emitted from the LED 111 is rotated by 90 degrees when passing through the LCD panel 20. Therefore, the above-described polarization conversion element 14 is preferably configured to convert the light into linearly polarized light (s-polarized light: polarized light parallel to the page) oscillating in a plane horizontal to the road surface from the visible light lighting unit 10 as shown in FIG. 9(*a*). In this embodiment, as shown in FIG. 9(*b*), the polarization conversion element 14 is configured by combining a plurality of translucent members 141 having a columnar shape whose cross section is parallelogramic (hereinafter, parallelogram column) and a plurality of translucent members 142 having a columnar shape whose cross section is triangular (hereinafter, triangular column) so as to be arranged in an array in parallel to the plane perpendicular to the light axis of the parallel light from the collimator unit 13. Further, at the interfaces between the adjacent translucent members arranged in an array, a PBS film and a reflection film are alternately provided, and the s-polarized light can be emitted by providing a half wave plate 143 on an emission surface from which the light which has been incident on the polarization conversion element 14 and has been reflected on the PBS film is emitted.

Figure 10:
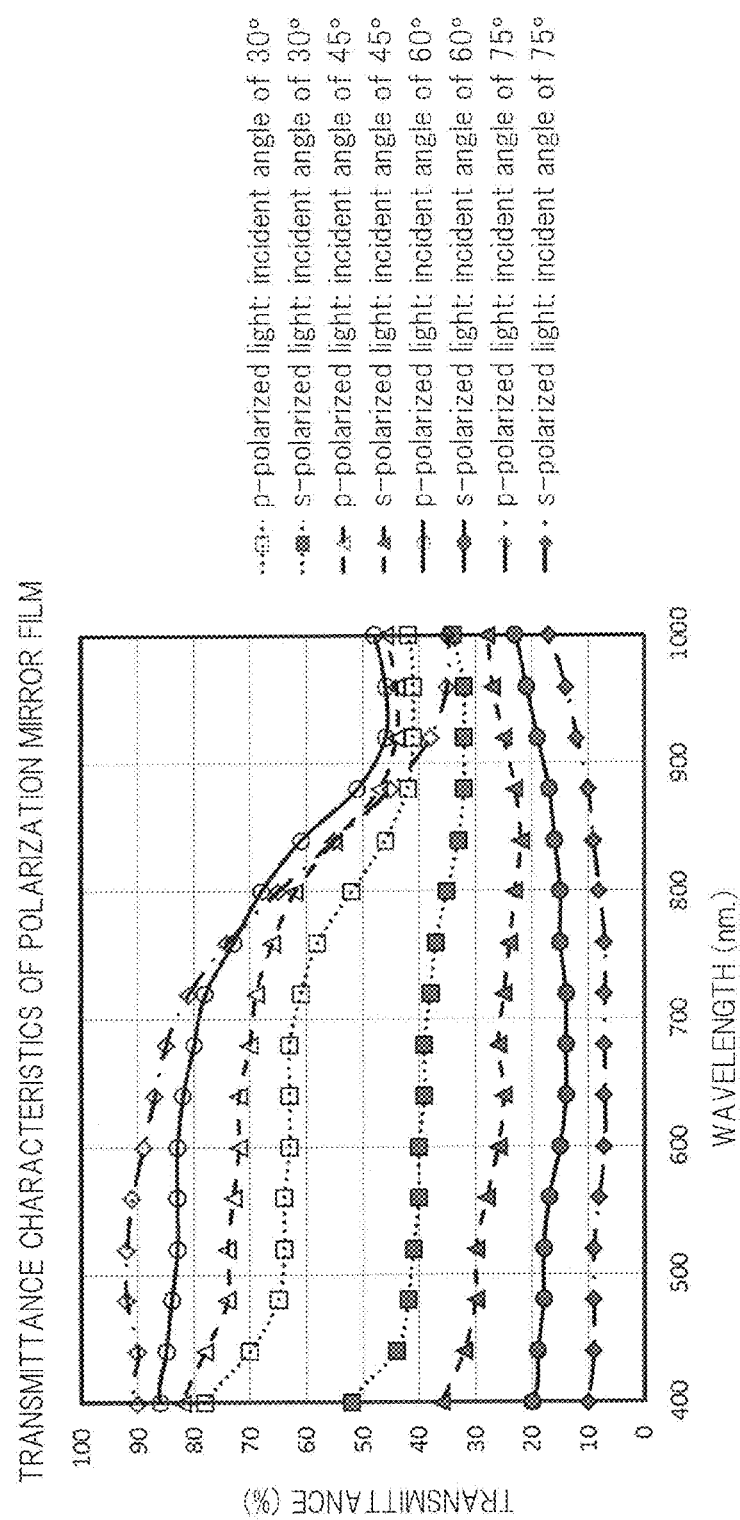
FIG. 10 is a graph of transmittance characteristics showing the transmittance of polarization mirror to wavelength of incident light with respect to p-polarized light and s-polarized light having different incident angles in the vehicle headlight apparatus according to the second embodiment of the present invention.

Meanwhile, the polarization mirror 30 (see FIG. 8) is attached so that the emission surface thereof is inclined downward by an angle θo of 45 degrees or more, more preferably, 60 degrees or more with respect to the light axis. In this embodiment, the angle θo is set to 60 degrees (θo=60°) as shown in FIG. 8. Note that, by setting the inclination angle θo of the polarization mirror 30 to 45 degrees or more, the reflectance of the s-polarized light incident from the outside can be increased while maintaining the high transmittance of the p-polarized light of the polarization mirror 30. Further, by inclining the emission surface of the polarization mirror 30 downward with respect to the light axis instead of upward, it is possible to set the larger angle θs of the normal surface of the polarization mirror to sunlight which is incident from above with respect to the horizontal (light axis) direction as shown in FIG. 8. FIG. 10 shows transmittance characteristics of the film designed as the polarization mirror 30. It can be understood that the transmittance of the s-polarized light is selectively decreased by the polarization mirror and the effect thereof becomes greater as the incident angle becomes larger. Accordingly, the transmittance of the s-polarization component in sunlight is lowered by the polarization mirror 30, the intensity of sunlight reaching the LCD panel 20 is weakened, and the burning and characteristic deterioration of the LCD panel 20 due to sunlight are prevented/suppressed.

In addition, since the polarization mirror 30 has the characteristics of low transmittance to the infrared light, it is possible to further prevent the burning and characteristic deterioration due to sunlight by reducing the infrared component contained in sunlight. Also, since a plate thickness t of the polarization mirror 30 arranged to be inclined sometimes becomes a factor to cause coma and astigmatism, the plate thickness t is preferably 1.5 mm or less and 0.6 mm or more in terms of strength.

In addition, when the LCD panel 20 is provided as described above, the free-form surface of the free-form surface lens 15 provided on the emission surface side of the polarization conversion element 14 in the visible light lighting unit 10 is set so as to collect the light in such a manner that the distribution of the light incident on the LCD panel 20 is intensified at the central portion thereof. Consequently, the distant lighting of the illumination light required in the headlight apparatus can be achieved.

With the headlight apparatus described above in detail, the emission light from the LED 111 is converted into substantially parallel light by the collimator unit 13 and is further converted into s-polarized light parallel to the page by the polarization conversion element 14. This emission light is collected by the free-form surface lens 15 so that the light intensity at the central portion thereof is increased, and is then applied to the LCD panel 20. Further, the light is converted into image light of various types of information by light modulation while passing through the LCD panel 20, and is then emitted to the polarization mirror 30. At that time, since the s-polarized light converted by the polarization conversion element 14 is converted into p-polarized light by the LCD panel 20, the light efficiently passes through the polarization mirror 30, specifically, 80% or more of the light passes through the polarization mirror 30. The light that has passed through the polarization mirror 30 is enlarged and projected by the projection lens 50 and is applied to the road surface and/or the front space.

Here, as shown in FIG. 7 and FIG. 8, it is also possible to further provide an infrared lighting unit 40 that emits infrared light in addition to the LCD panel 20 described above. Note that the infrared lighting unit 40 is configured to emit the infrared light for an infrared sensor (not shown here) that detects the situations outside the vehicle in the nighttime. In the embodiment shown in the drawings, the headlight apparatus uses the polarization mirror 30 to superimpose the infrared light from the infrared lighting unit 40 onto the illumination light from the visible light lighting unit 10, thereby applying the illumination light onto the road surface in front of the vehicle.

Figure 11:
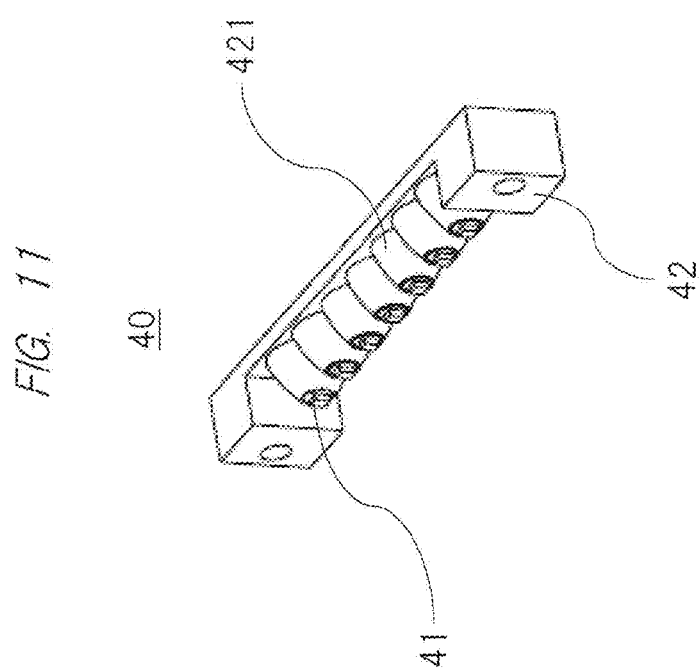
FIG. 11 is a perspective view showing an overall configuration of an infrared lighting unit in the vehicle headlight apparatus according to the second embodiment of the present invention.

As shown in FIG. 11, the infrared lighting unit 40 is configured by attaching one or a plurality of semiconductor infrared LEDs (Light Emitting Diodes) 41 which are solid light sources to an infrared LED collimator unit 42 as in the visible light lighting unit described above. In the embodiment shown in the drawings, the case in which a plurality of (seven) infrared LEDs 41 are arranged in a row and each of the infrared LEDs 41 is fixed so as to be located at the central portion of a concave portion (see a reference character 134 of FIG. 5) of an infrared LED collimator 421 constituting the infrared LED collimator unit 42 is shown as an example. Though not shown here, it is obvious for a person having ordinary skill in the art that the infrared LED 41 is also arranged on a board having a control circuit or the like thereon like the LED 111 described above and a heat sink for dissipating heat from the LED to ambient air is attached to a rear surface of the board.

As can be seen from FIG. 7 and FIG. 8, the infrared lighting unit 40 is disposed using the polarization mirror 30 described above. Namely, as an example, the infrared lighting unit 40 is disposed below the light axis of the polarization mirror 30 attached so that the emission surface thereof is inclined by a desired angle with respect to the light axis. Consequently, the infrared light emitted from the infrared LED 41 is reflected on the surface of the polarization mirror 30, is superimposed on the illumination light from the visible light lighting unit 10, and is applied to the road surface in front of the vehicle. At that time, it is desired to set the installation angle at which the component of sunlight reflected by the polarization mirror 30 is not incident on the infrared lighting unit 40.

According to the second embodiment described above in detail, by mounting the infrared lighting unit capable of emitting the infrared light together with the LCD panel which enables the light distribution control while preventing the deterioration due to sunlight, it is possible to realize the effect that the headlight apparatus with higher functionality can be manufactured at low cost and the size reduction and modularization thereof are facilitated as in the first embodiment described above.

Third Embodiment

Further, FIG. 12 shows a configuration example in which a shade 60 is provided inside the headlight apparatus in addition to the configuration of the first embodiment described above. Note that the shade 60 enables to form the headlight cut-off line (light distribution) required for the passing beam (so-called low beam) from the vehicle headlamp when vehicles pass by each other. As shown in the drawings, the shade 60 is configured of a light-shielding member formed into a predetermined shape, and is disposed and fixed in the vicinity of the focal point of the projection lens 50.

With the shade 60 described above, a lighting pattern of illumination light such as the cut-off line required for the passing beam (so-called low beam) can be formed by blocking a part of the illumination light from the visible light lighting unit 10. Note that, though not shown here, the shade 60 may be commonly used for driving beam (so-called high beam) by providing a rotation mechanism such as an electric motor to make the position thereof movable, other than the fixed type shown in the drawings.

As described above, according to the third embodiment, the headlight apparatus having still higher functionality can be manufactured at low cost, and the headlight apparatus can be reduced in size and easily modularized.

Fourth Embodiment

Further, FIG. 13 shows a configuration example in which the visible light lighting unit 10 which is a light source device is small with respect to the LCD panel 20, as a modification example of the configuration of the first embodiment described above.

When the visible light lighting unit 10 is small with respect to the LCD panel 20, it is necessary that the substantially parallel light emitted from the polarization conversion element 14 is narrowed by the free-form surface lens 15 in accordance with the size of the LCD panel 20. In FIG. 13, the narrowing is realized by forming the incident surface and the emission surface of the free-form surface lens 15 to have convex shape and increasing the distance between the polarization conversion element 14 and the LCD panel 20. Further, in order to apply the light from the small LCD panel 20 with a wide distribution angle through the projection lens 50, the focal length of the projection lens 50 is shortened and the distance between the LCD panel 20 and the projection lens 50 is reduced.

As described above, according to the fourth embodiment, the headlight apparatus with higher functionality can be manufactured at low cost by using a smaller LCD panel, and the headlight apparatus can be reduced in size and easily modularized.

With the vehicle headlight apparatus according to the present invention described above in detail, it is possible to realize a low-power consumption and long-life vehicle headlight apparatus excellent for environmental protection and having high light use efficiency.

In the foregoing, the vehicle headlight apparatus according to various embodiments of the present invention has been described. However, the invention is not limited to the embodiments described above and includes various modification examples. For example, the embodiments above have described the overall system in detail for easy description of the present invention, and the present invention is not always limited to those including all of the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

100: headlight apparatus, 10: visible light lighting unit, 11: LED board, 111: LED, 12: heat sink, 13: collimator unit, 131: collimator, 132: outer peripheral surface, 133: convex portion (convex lens surface), 134: concave portion, 135: convex lens surface, 14: polarization conversion element, 143: half wave plate, 15: free-form surface lens, 20: liquid crystal panel (LCD panel), 30: polarization mirror, 40: infrared lighting unit, 41: infrared LED, 42: infrared LED collimator unit, 50: projection lens

The invention claimed is:

1. A vehicle headlight apparatus attached to a part of a vehicle and applying illumination light to a road surface on which the vehicle runs, the vehicle headlight apparatus comprising:
    a light source device configured to generate the illumination light; and
    a lens disposed on a light axis of the light source device and configured to project the illumination light from the light source device so as to form a desired light distribution,
    wherein the light source device includes:
        one or a plurality of semiconductor light source elements configured to emit white light;
        a collimator unit having one or a plurality of collimators disposed on a light emission axis of each of the semiconductor light source elements and configured to convert the white light emitted from each of the semiconductor light source elements serving as a solid light source into substantially parallel light; and
        a polarization conversion element provided for each of the semiconductor light source elements and the plurality of the collimators on an emission surface side of the collimator unit and configured to convert incident light into predetermined polarized light, and
    the illumination light emitted from the polarization conversion element of the light source device is applied in a predetermined direction through the lens.

2. The headlight apparatus according to claim 1, wherein the illumination light emitted from the lens is p-polarized light oscillating in a plane perpendicular to the road surface.

3. The headlight apparatus according to claim 1, further comprising
    an image display element disposed on a light axis connecting the polarization conversion element and the lens.

4. The headlight apparatus according to claim 3, wherein the image display element is a LCD panel.

5. The headlight apparatus according to claim 4, wherein a polarization mirror is further disposed between the LCD panel and the lens so that an emission surface of the polarization mirror is inclined downward by a predetermined angle.

6. The headlight apparatus according to claim 1, further comprising
    a free-form surface lens provided on an emission surface side of the polarization conversion element constituting the light source device.

7. The headlight apparatus according to claim 1, further comprising
    an infrared light emitting unit configured to generate infrared light.

8. The headlight apparatus according to claim 7,
wherein the infrared light emitting unit includes: one or a plurality of semiconductor infrared elements configured to emit infrared light; and an infrared collimator unit having one or a plurality of infrared collimators disposed on a light emission axis of each of the semiconductor infrared elements and configured to convert light emitted from the semiconductor infrared element into substantially parallel light.

9. The headlight apparatus according to claim 8, further comprising
an image display element disposed on a light axis connecting the polarization conversion element and the lens,
wherein a polarization mirror is further disposed between the image display element and the lens so that an emission surface of the polarization mirror is inclined downward by a predetermined angle and the infrared light emitting unit is configured so that the emitted infrared light is reflected on an emission surface of the polarization mirror and is applied in a predetermined direction through the lens.

10. The headlight apparatus according to claim 1,
wherein each of the collimators constituting the collimator unit is formed of translucent resin, has a conical convex outer peripheral surface obtained by rotating a substantially parabolic cross section, and has a concave portion having a lens surface formed at its central portion.

* * * * *